United States Patent
Benton, Jr. et al.

(10) Patent No.: US 12,331,523 B1
(45) Date of Patent: *Jun. 17, 2025

(54) CRYOGENIC TRENCH/TROUGH APPARATUS AND METHOD

(71) Applicant: WASKEY BRIDGES, INC., Baton Rouge, LA (US)

(72) Inventors: Stephen G. Benton, Jr., Metairie, LA (US); Benjamin Owens, Baton Rouge, LA (US); Charlie Belsom, Covington, LA (US); Kevin Babin, Baton Rouge, LA (US); Jon Gary, Baton Rouge, LA (US)

(73) Assignee: WASKEY BRIDGES, INC., Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,126

(22) Filed: Dec. 5, 2023

Related U.S. Application Data

(63) Continuation of application No. 17/955,929, filed on Sep. 29, 2022, now Pat. No. 11,866,942, which is a
(Continued)

(51) Int. Cl.
*E03F 5/04* (2006.01)
*E04D 13/064* (2006.01)
(Continued)

(52) U.S. Cl.
CPC ............ *E04D 13/0646* (2013.01); *E03F 5/04* (2013.01); *F16L 1/06* (2013.01); *F17C 2260/037* (2013.01); *F17D 1/082* (2013.01)

(58) Field of Classification Search
CPC ......... E03F 5/04; E03F 5/0401; E03F 5/0407; E03F 3/046; E02B 5/02; F16L 1/06; E04D 13/0646
See application file for complete search history.

(56) References Cited

U.S. PATENT DOCUMENTS

| | | | | |
|---|---|---|---|---|
| 4,940,359 A | * | 7/1990 | Van Duyn | E01C 11/227 405/126 |
| 5,810,511 A | * | 9/1998 | Schmidt | E02D 31/00 405/303 |

(Continued)

*Primary Examiner* — Frederick L Lagman
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A method of installing a trough or trench for containing a cryogenic spill, includes the step of constructing multiple precast concrete sections at a first location, each section having a bottom wall and spaced apart side walls connected to and extending up from the bottom wall. Each section has end portions that enable connection to another concrete section. The method includes (at the first location), preparing multiple panels of polymeric concrete material by filling one or more molds with a slurry or liquid polymeric concrete material and after time allowing the material to cure and harden. At the first location, one or more of the panels is adhered to the bottom wall and side walls of each concrete section using an adhesive. After adhering of the panels to the concrete sections, the concrete sections are transported from the first location to a second location that is remote from the first location. At the second location, the concrete sections are connected together using connections that join one end portion of a concrete section to and end portion of another concrete section. In one embodiment, the trough or trench is placed next to a pipe rack having cryogen containing flow lines. A slab and riser arrangement preferably channel any spill to the trough or trench.

24 Claims, 9 Drawing Sheets

Related U.S. Application Data continuation of application No. 17/352,594, filed on Jun. 21, 2021, now Pat. No. 11,473,308, which is a continuation of application No. 16/596,081, filed on Oct. 8, 2019, now Pat. No. 11,041,299, which is a continuation of application No. 16/223,581, filed on Dec. 18, 2018, now Pat. No. 10,487,510, which is a continuation-in-part of application No. 16/156,844, filed on Oct. 10, 2018, now Pat. No. 10,495,235.

(60) Provisional application No. 62/760,257, filed on Nov. 13, 2018, provisional application No. 62/599,905, filed on Dec. 18, 2017, provisional application No. 62/580,943, filed on Nov. 2, 2017, provisional application No. 62/570,369, filed on Oct. 10, 2017.

(51) Int. Cl.
*F16L 1/06* (2006.01)
*F17D 1/08* (2006.01)

(56) References Cited

U.S. PATENT DOCUMENTS

| | | | |
|---|---|---|---|
| 10,487,510 B1* | 11/2019 | Benton, Jr. | E04B 5/02 |
| 10,495,235 B1* | 12/2019 | Benton, Jr. | E03F 5/0407 |
| 11,041,299 B1* | 6/2021 | Benton, Jr. | F16L 1/06 |
| 11,473,308 B1* | 10/2022 | Benton, Jr. | F16L 1/06 |
| 11,866,942 B1* | 1/2024 | Benton, Jr. | E03F 5/04 |
| 2008/0210305 A1* | 9/2008 | Kolodziej | C10L 3/10 |
| | | | 62/45.1 |

* cited by examiner

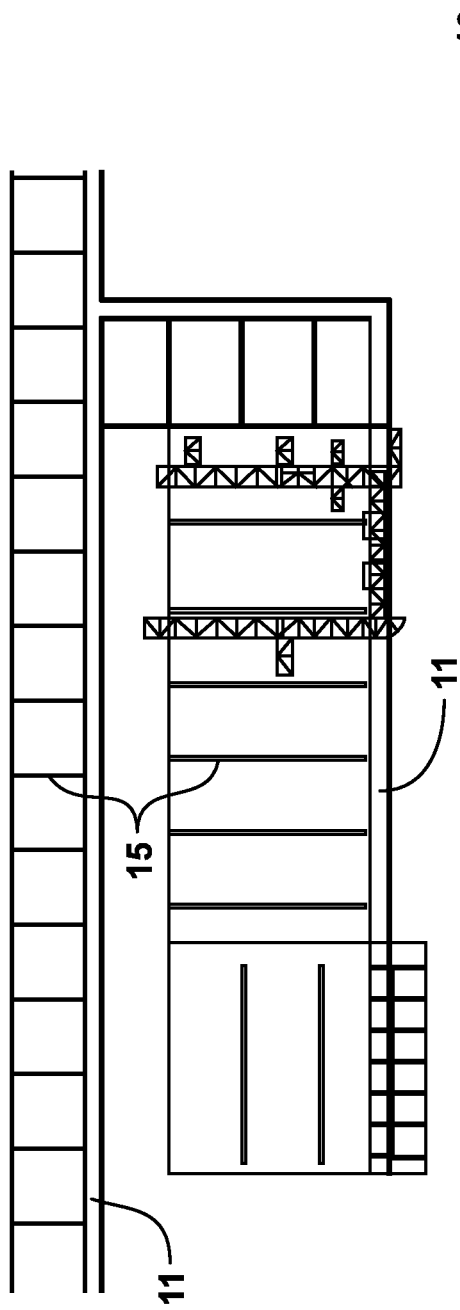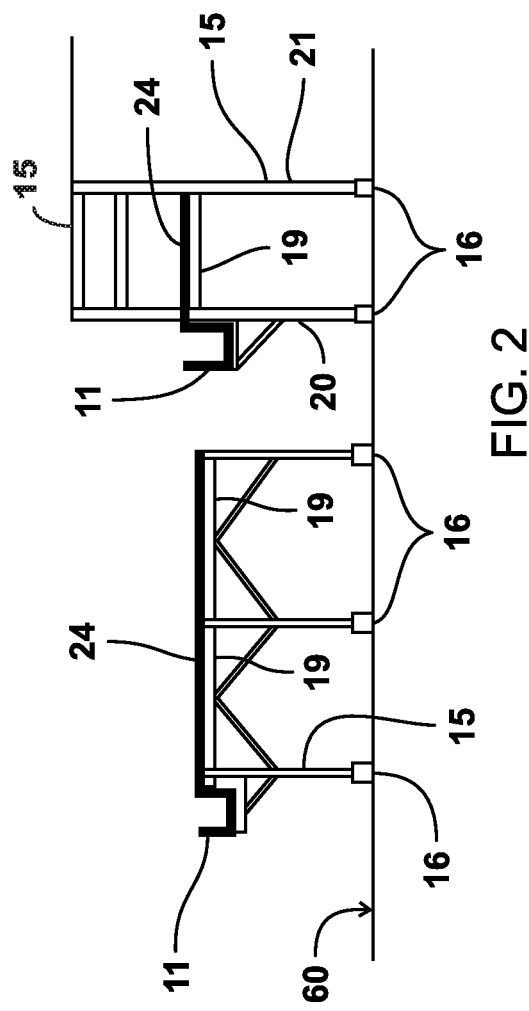

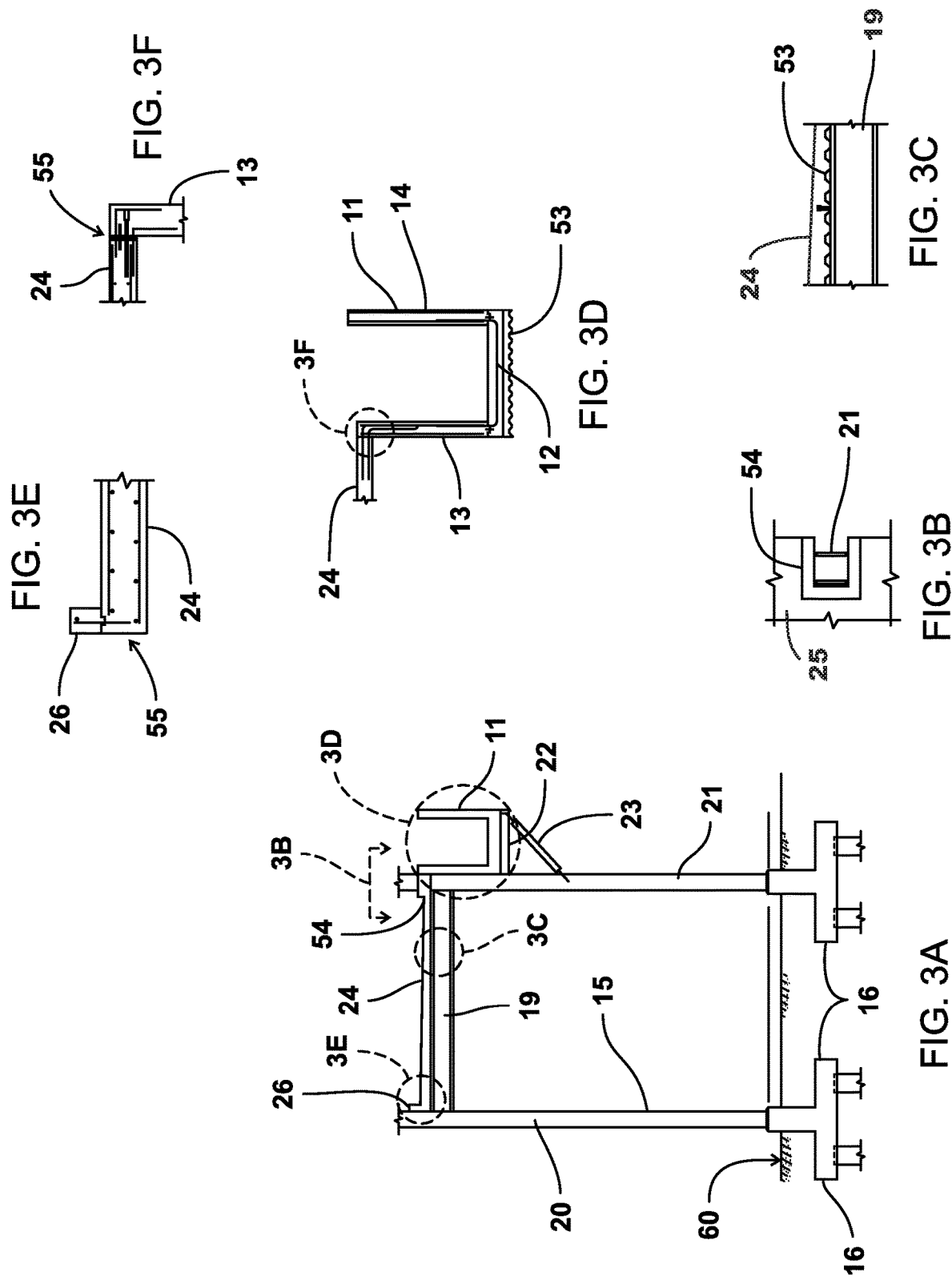

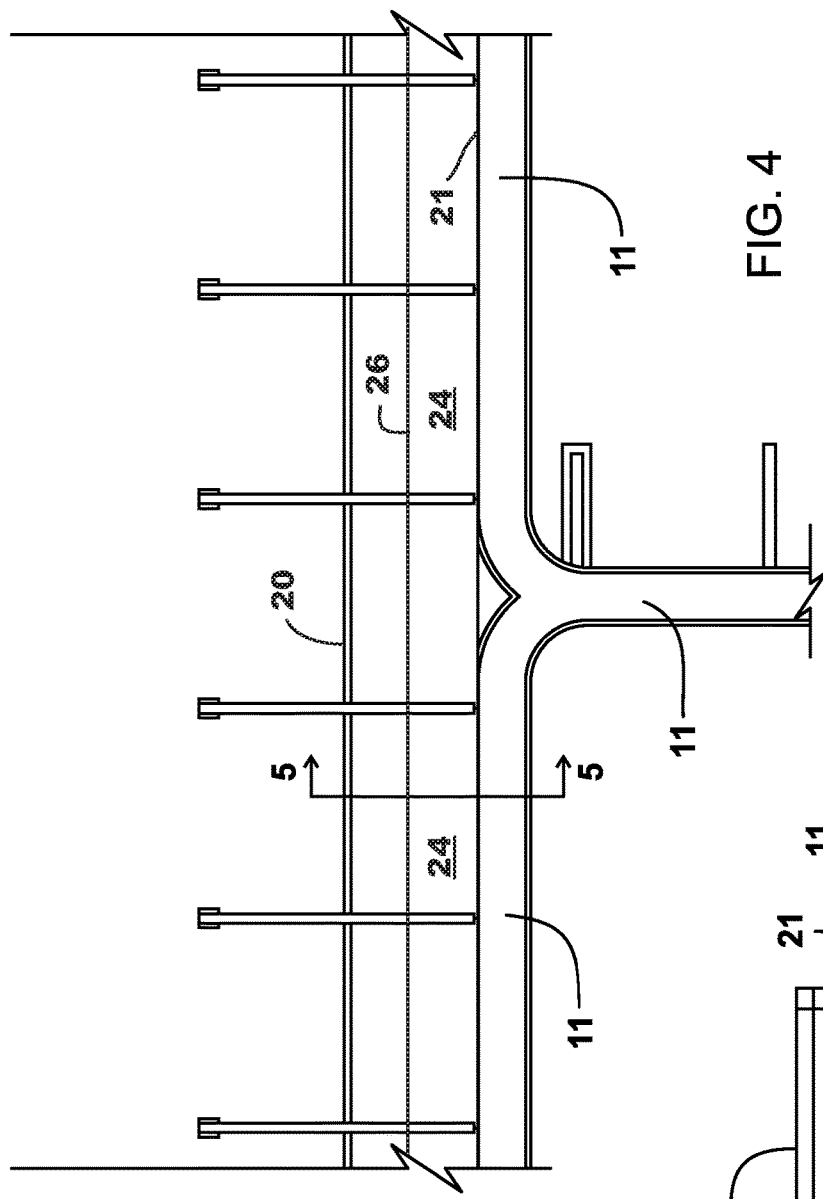
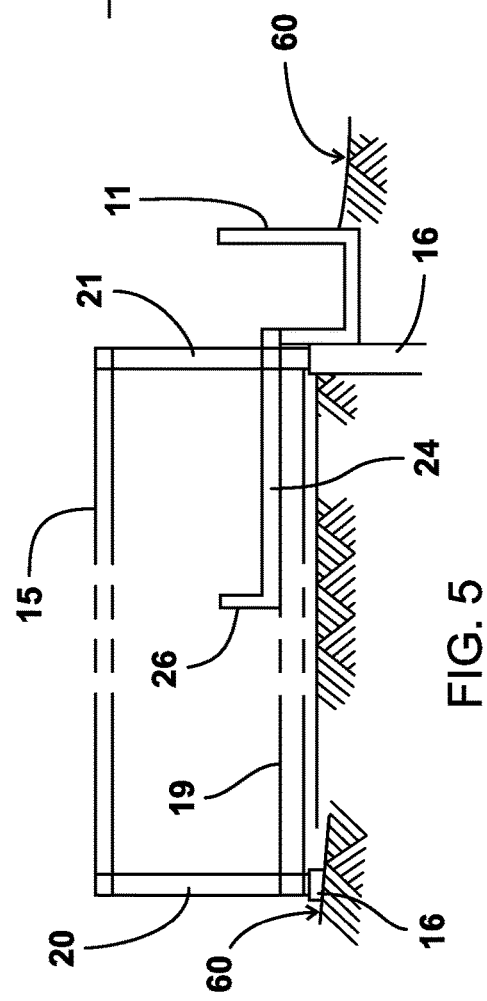
FIG. 4
FIG. 5

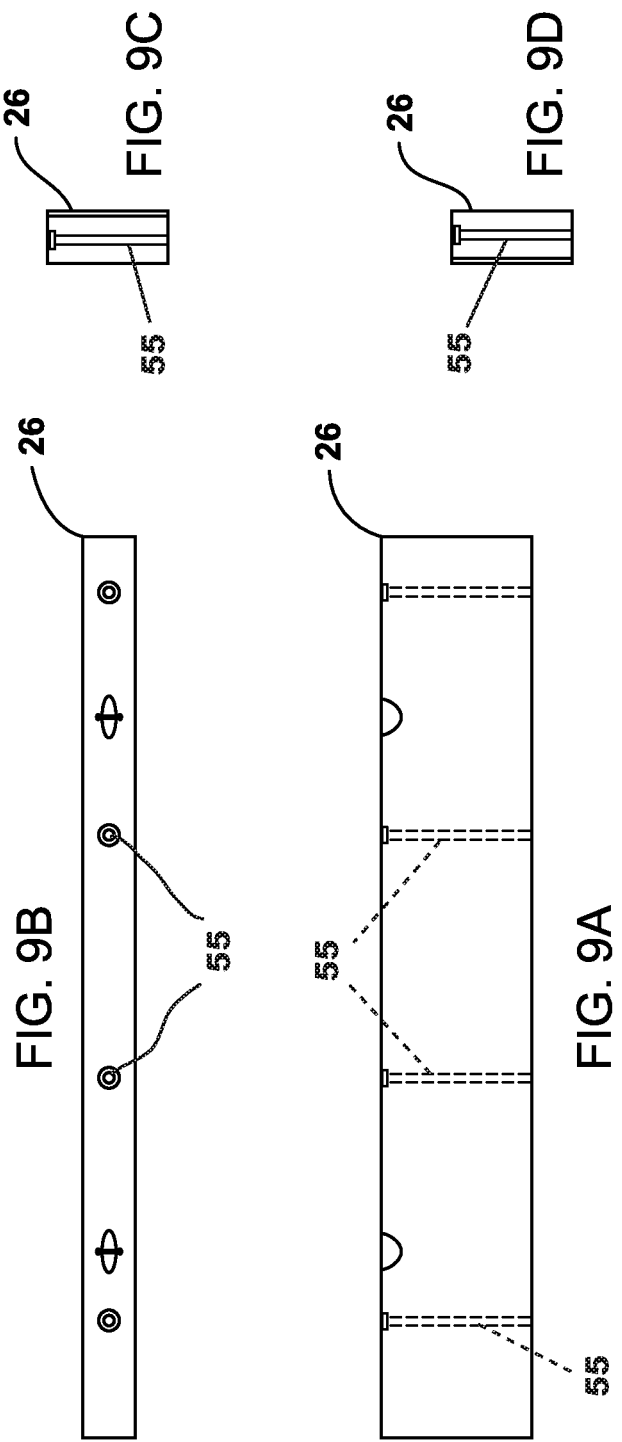

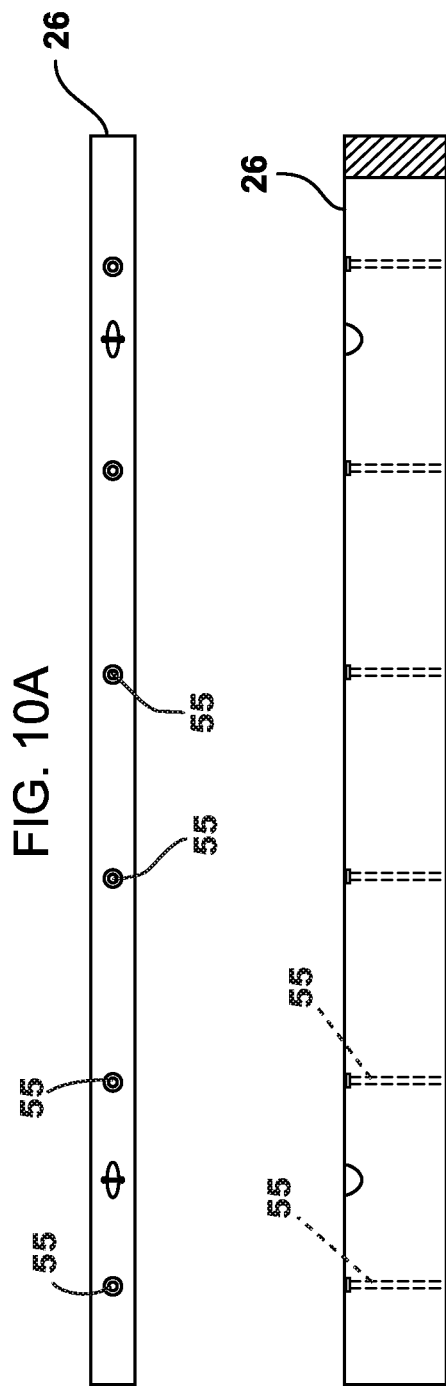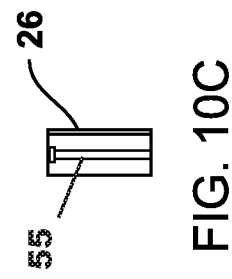

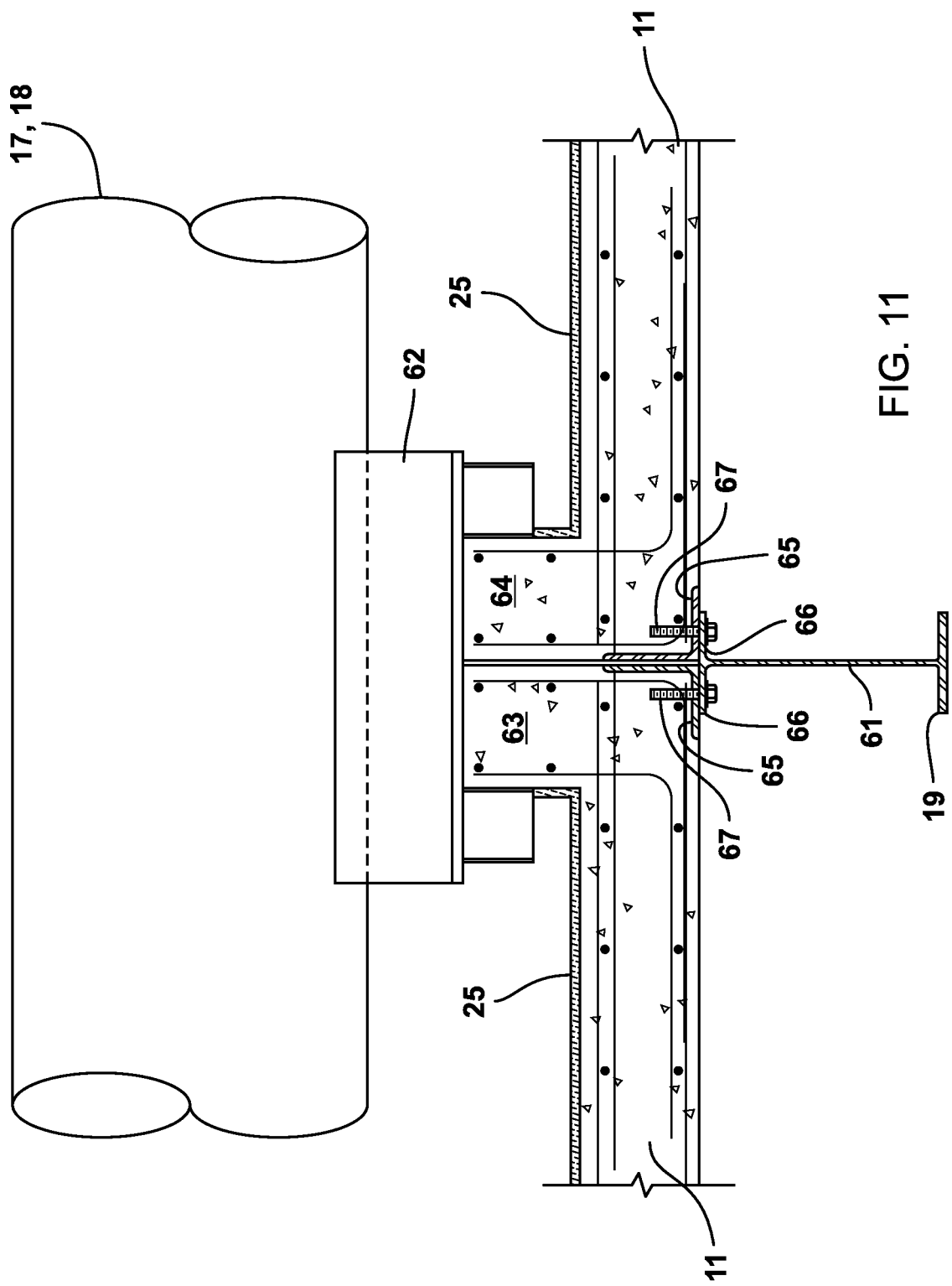

CRYOGENIC TRENCH/TROUGH APPARATUS AND METHOD

CROSS-REFERENCE TO RELATED APPLICATIONS

This application is a continuation of U.S. patent application Ser. No. 17/955,929, filed 29 Sep. 2022 (issued as U.S. Pat. No. 11,866,942 on 9 Jan. 2024), which is a continuation of U.S. patent application Ser. No. 17/352,594, filed 21 Jun. 2021 (issued as U.S. Pat. No. 11,473,308 on 18 Oct. 2022), which is a continuation of U.S. patent application Ser. No. 16/596,081, filed 8 Oct. 2019 (issued as U.S. Pat. No. 11,041,299 on 22 Jun. 2021), which is a continuation of U.S. patent application Ser. No. 16/223,581, filed 18 Dec. 2018 (issued as U.S. Pat. No. 10,487,510 on 26 Nov. 2019), which is a continuation in part of U.S. patent application Ser. No. 16/156,844, filed 10 Oct. 2018 (issued as U.S. Pat. No. 10,495,235 on 3 Dec. 2019), which claims benefit of U.S. Provisional Patent Application Ser. No. 62/570,369, filed 10 Oct. 2017; U.S. Provisional Patent Application Ser. No. 62/580,943, filed 2 Nov. 2017; and U.S. Provisional Patent Application Ser. No. 62/599,905, filed 18 Dec. 2017, each of which is hereby incorporated herein by reference and priority to/of each is hereby claimed.

This application claims benefit of U.S. Provisional Patent Application Ser. No. 62/599,905, filed 18 Dec. 2017; and U.S. Provisional Patent Application Ser. No. 62/760,257, filed 13 Nov. 2018, each of which is hereby incorporated herein by reference and priority to/of each is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for construction of a cryogenic trench that features concrete precast sections that are fitted with cast panels, transported to a job site and assembled with special connections. In one embodiment, a pipe rack section having cryogenic fluid containing flow lines is provided wherein reinforced concrete riser and trough sections channel/catch any spillage from the pipes.

2. General Background of the Invention

Liquified natural gas (LNG) can include methane and ethane. When the gas is cooled to approximately -260 degrees Fahrenheit, it can be transported in a liquid state. In a liquid state, LNG takes up 1/600th of the space compared to a gaseous phase, making it much easier to ship and store when pipeline transport is not feasible. The present invention provides a method and apparatus for construction and installation of precast troughs or trenches that are lined with panels that are capable of handling spillage of cryogenic material such as liquified natural gas or LNG.

The following are hereby incorporated herein by reference:

U.S. Provisional Patent Application Ser. No. 62/570,369, filed 10 Oct. 2017; U.S. Provisional Patent Application Ser. No. 62/580,943, filed 2 Nov. 2017; U.S. Provisional Patent Application Ser. No. 62/599,905, filed 18 Dec. 2017; U.S. Provisional Patent Application Ser. No. 62/760,257, filed 13 Nov. 2018; and U.S. patent application Ser. No. 16/156,844, filed 10 Oct. 2018.

BRIEF SUMMARY OF THE INVENTION

A method of installing a trench for containing a cryogenic spill, comprising the steps of:

constructing multiple precast concrete sections to form a trough, each section preferably having a bottom wall and spaced apart side walls connected to and extending up from the bottom wall; wherein each section has end portions that preferably enable connection to another concrete section;

at a first location, preparing multiple panels of polymeric concrete material by preferably filling one or more molds with a slurry or liquid polymeric concrete material and after time allowing the material to cure and harden;

at the first location, preferably adhering one or more of the multiple panels to the bottom wall and side walls of each concrete section preferably using an adhesive;

transporting the concrete sections from the first location to a second location that preferably includes pipe racks holding elevated cryogenic containing flow lines;

at the second location, connecting the concrete sections together preferably using connections of one end portion to another end portion;

preferably applying an epoxy grout to the connections at the second location;

wherein the connection includes preferably spacing the end portions apart to form a gap and filling the gap with a seal;

placing the trough next to the pipe racks;

connecting the trough to an area preferably under the pipe rack with a slab; and placing a riser on the slab preferably opposite the trough.

In various embodiments, each panel can have an upper surface and a lower surface and further comprising applying the adhesive to the upper surface.

In various embodiments, a release liner can be applied to the mold.

In various embodiments, each panel can be between about one half and three inches thick.

In various embodiments, the pipe racks preferably support the trough.

In various embodiments, the liquid polymeric concrete material can be a cryogenic insulating material.

In various embodiments, the release liner can include animal fat.

In various embodiments, the release liner can include lard.

In various embodiments, at least one of the side walls can have a side wall height and wherein the panels can extend vertically only part of the side wall height.

In various embodiments, the riser can be a precast concrete section.

A method of installing a trench for containing a cryogenic spill, comprising the steps of:

constructing multiple precast concrete sections to form a trough, each section preferably having a bottom wall and spaced apart side walls connected to and extending up from the bottom wall;

each section has end portions that preferably enable connection to another concrete section;

at a first location, preparing multiple panels of polymeric concrete material by preferably filling one or more molds with a slurry or liquid polymeric concrete material and after time allowing the material to cure and harden;

at the first location, adhering one or more of the multiple panels to the bottom wall and side walls of each concrete section preferably using an adhesive;

transporting the concrete sections from the first location to a second location that has a pipe rack support structure that supports one or more cryogenic material flow lines;

at the second location, connecting the concrete sections together preferably using connections of one end portion to another end portion;

applying a non-sag filler to the connections at the second location;

placing the trough next to the pipe racks;

connecting the trough to an area under the pipe rack with a slab; and placing a vertically extending riser on the slab opposite the trough.

In various embodiments, the trough can be supported at least in part by the pipe rack.

In various embodiments, the flow lines can be in between the trough and the riser.

In various embodiments, the side walls can be of differing heights.

In various embodiments, the trough can have a side wall that is shorter and wherein the riser extends above the shorter side wall.

In various embodiments, the trough has a side wall that is taller and wherein the taller side wall extends above the flow lines.

In various embodiments, the riser can extend above the one or more flow lines.

A cryogen flow line spill containment apparatus, comprising:

a pipe rack structure having a base with support footings and a superstructure extending up from the base;

the rack structure including a transverse support that can be elevated above the support footings;

a slab supported by the transverse support;

a reinforced concrete trough next to the slab and positioned to receive any spillage of cryogen material from the flow line or lines;

a riser extending vertically from the slab and positioned opposite the trough;

multiple cryogen insulative panels attached to the trough and to the slab;

the trough being formed of multiple trough sections placed end to end, each section having a bottom wall and spaced apart side walls; and a cryogen insulative filler placed at a joint of one section to another, adjacent the section.

In various embodiments, each section has multiple attached cryogen insulative panels.

In various embodiments, the riser can be of a concrete material.

In various embodiments, the riser can extend above the one or more flow lines.

In various embodiments, the side walls can be of differing heights

In various embodiments, each section side wall can have a cryogen insulative panel attached thereto.

In various embodiments, each section bottom wall can have a cryogen insulative panel attached thereto.

In various embodiments, the section bottom wall can be below the slab.

In various embodiments, the side walls include a taller side wall having an upper edge that is at about the same level as the slab.

In various embodiments, the side walls can include a taller side wall and a shorter side wall.

In various embodiments, the sections can be elevated and supported by the pipe rack structure.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a plan view showing a layout for a preferred embodiment of the apparatus of the present invention;

FIG. 2 is an elevation view of a preferred embodiment of the apparatus of the present invention;

FIGS. 3A-3F show construction details for a preferred embodiment of the apparatus of the present invention;

FIG. 4 is a schematic diagram showing a preferred embodiment of the apparatus of the present invention;

FIG. 5 is a partial sectional elevation view taken along lines 5-5 of FIG. 4;

FIGS. 9A-9D show fragmentary views of a preferred embodiment of the apparatus of the present invention;

FIGS. 10A-10C show fragmentary views of a preferred embodiment of the apparatus of the present invention; and FIG. 11 is a partial elevation view of a preferred embodiment of the apparatus of the present invention.

DETAILED DESCRIPTION OF THE INVENTION

Figure 6:
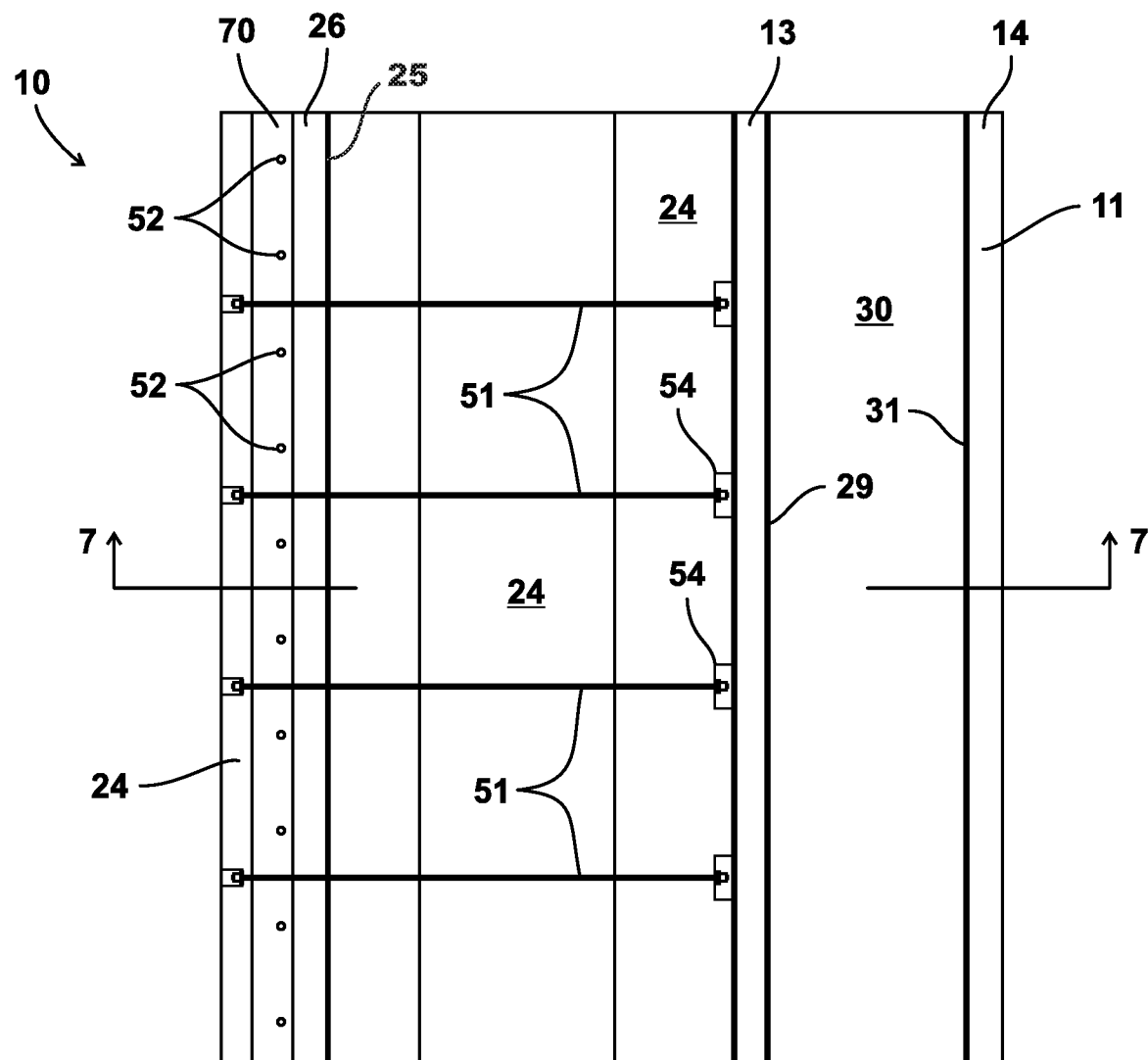
FIG. 6 is a plan view of a preferred embodiment of the apparatus of the present invention showing a trough section for a turn or bend.

FIGS. 1-11 show a preferred embodiment of the apparatus of the present invention designated generally by the numeral 10. Cryogenic containment trough or trench apparatus 10 provides multiple, connectable trench or trough sections 11 preferably connected end to end. Each trough section 11 has a bottom wall 12 and side walls 13, 14. Each trench or trough section 11 has opposing end portions. Two or more such trough sections 11 are preferably connectable end to end using interlocking connections (e.g., tongue and groove). In some cases, the sections 11 are preferably spaced apart (e.g., about ½ inch-one inch) to provide a gap that can be filled with a seal or sealer such as a non-sag material sold commercially under the mark "Insulpox" or a sealer from Valpac (e.g. Cryo-Bond 837). The non-sag sealer is preferably a composition used with cryogenic temperatures and can be commercially available from Chemco Systems of Redwood City, California sold under the trademark Insul-POX, or a butyl rubber elastomer available from Valpac, Inc. sold as Cryo-bond 837 Butyl Rubber Elastomer. A seal or sealer and a method of connecting the trough sections 11, each of which can be used in one or more preferred embodiments of the present invention, are described in U.S. patent application Ser. No. 16/156,844, filed Oct. 10, 2018, which is incorporated herein by reference.

Information regarding installation of a seal or sealer such as InsulPOX can be seen in the InsulPOX Installation Guide, filed in U.S. Provisional Patent Application Ser. No. 62/760,257, filed Nov. 13, 2018, which is incorporated herein by reference. Information regarding installation of a seal or sealer, such as a backer rod or closed cell material, preferably at all exterior and interior joint openings that preferably do not receive the non-sag material can be seen in the Emseal Installation Guide filed in U.S. Provisional Patent Application Ser. No. 62/760,257, filed Nov. 13, 2018, which is incorporated herein by reference. Information regarding embodiments of the interlocking connections and expansion joints of trough sections 11 can be seen in the drawings filed in U.S. Provisional Patent Application Ser. No. 62/760,257, filed Nov. 13, 2018, which is hereby incorporated herein by reference.

Figure 7:
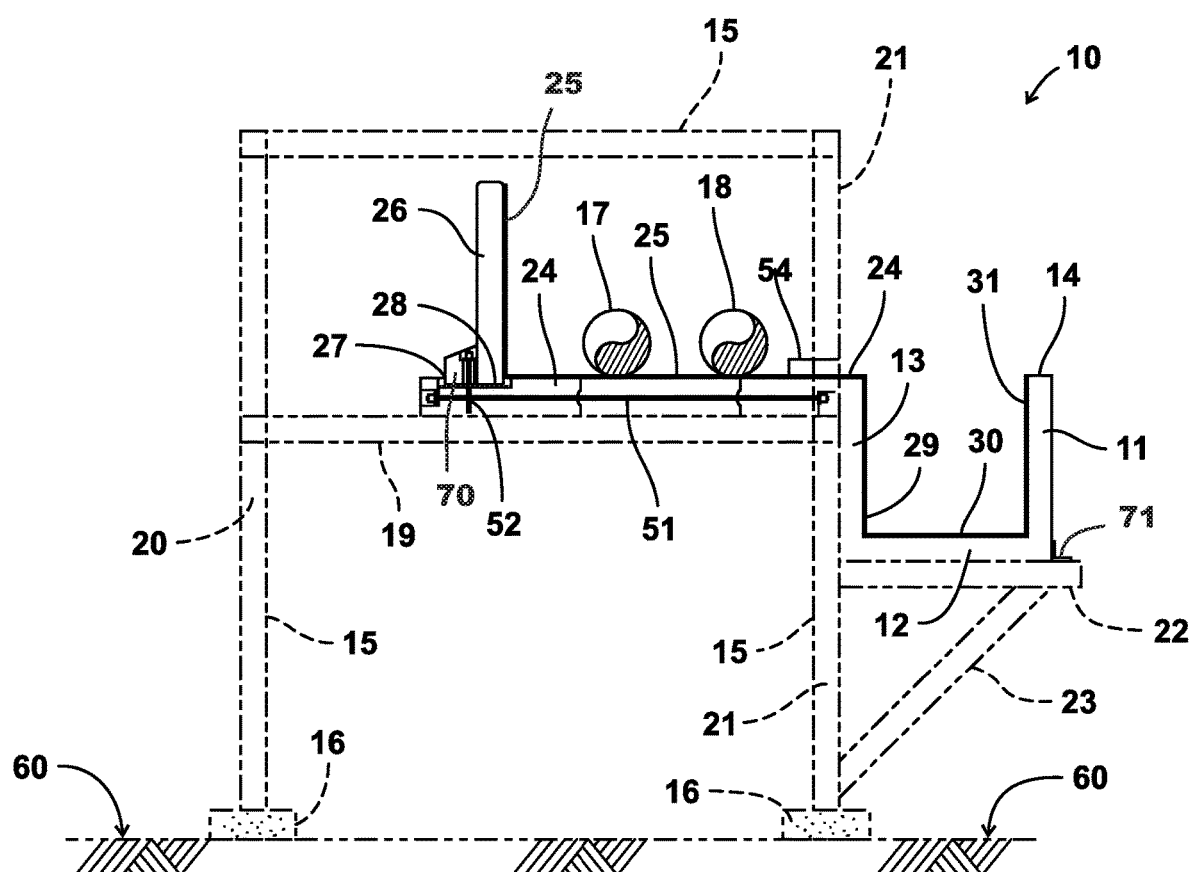
FIG. 7 is a sectional elevation view taken along lines 7-7 of FIG. 6.
Figure 8:
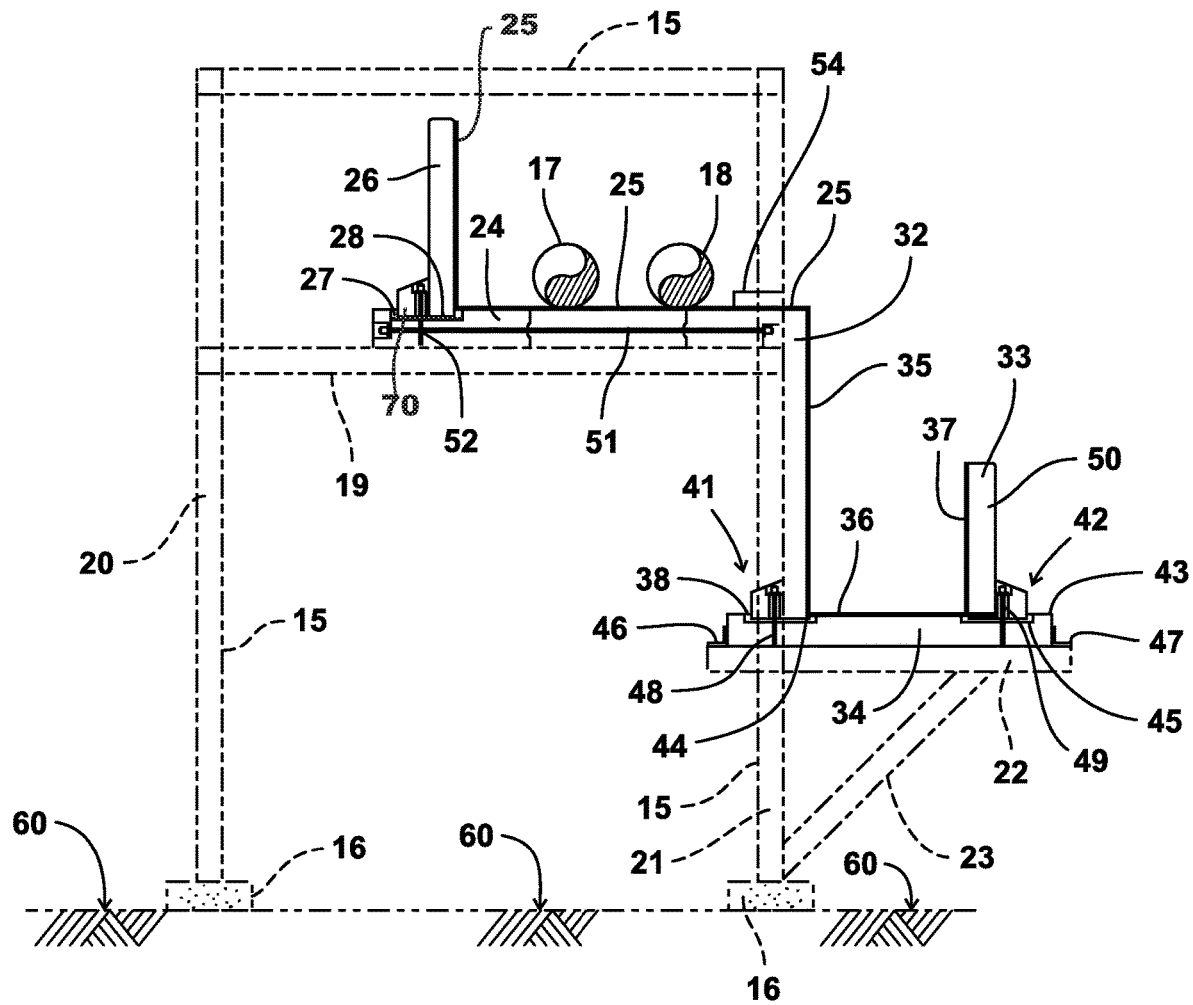
FIG. 8 is a sectional elevation view of a preferred embodiment of the apparatus of the present invention.

In FIGS. 2, 7 and 8, pipe rack or support structure 15 has footings or a foundation 16 (e.g., reinforced concrete) that can extend down into a soil mass 60. Supported upon the pipe rack 15 are preferably cryogen (e.g., liquified natural gas (LNG)) containing flow lines or pipes 17, 18 as seen in FIGS. 7, 8. Each of these flow lines 17, 18 can be supported by resting upon transverse beam 19 and containment 24. Beam 19 is preferably a part of support structure 15. The transverse beam 19 can be provided with a precast concrete containment 24 upon which the pipes 17, 18 rest. Precast concrete containment 24 preferably has a sloped surface towards trough 11, as seen in FIGS. 3A and 3C. Pipe rack or support structure 15 can also include a number of columns 20, 21 and transverse beam 22. Diagonal support 23 extends from a column 21 to transverse beam 22. In FIG. 5, rack 15 rests upon earth's surface or soil mass 60. Curb 54 can surround beam 21 at panel 25, as seen in FIGS. 3B, 7 and 8.

FIGS. 3A-3F show details of a preferred embodiment of the cryogenic containment trough or trench apparatus 10. FIG. 3B shows curb 54 surrounding column 21 at panel 25. Transverse beam 19 can support metal deck 53 under containment 24 as seen in FIG. 3C. FIG. 3D shows details of trough 11 and metal deck 53. Transverse beam 22 can support metal deck 53 under bottom wall 12. FIG. 3E shows capping/riser 26 at an end of containment 24. FIG. 3F shows details of a connection between containment 24 and side wall 13. Reinforcing (e.g., steel rods) 55 can be provided in precast concrete containment 24, at the connection of wall 13 to containment 24 and at the joint of 24 to 26 (see FIGS. 3E and 3F).

A number of cryogenic panels 25 are provided for controlling any spillage of cryogen materials such as liquified natural gas which flows in the lines 17, 18. The cryogenic or cryogen insulative panels 25 can be pre-fabricated using molds that initially hold a material that is commercially available, sold under the mark "Insulpox". A method of making the cryogenic insulative panels is described in U.S. patent application Ser. No. 16/156,844, filed Oct. 10, 2018, and is incorporated herein by reference.

A vertically extending cryogenic insulating capping or riser 26 extends upwardly from precast concrete containment 24, as seen in FIGS. 7, 8. Joint 70 can be provided for joining capping or riser 26 to precast concrete containment 24. Fasteners 52 can secure riser 26 to precast containment 24. There can be provided a recess 28 in precast concrete containment 24 that is preferably receptive of the lower end portion of the riser 26 as seen in FIGS. 7 and 8. A cryogenic insulating panel 25 preferably extends across the top of precast concrete containment 24, and under riser 26 ending at end 27. Notice in FIGS. 7 and 8 that the recess 28 can also be covered with part of cryogenic panel 25.

Other cryogenic panels 29-31 can be provided. These panels are preferably used to line the bottom and side walls 12, 13, 14 of trough section 11. In FIG. 7, cryogenic panel 29 is adhered to side wall 13. Cryogenic panel 30 is adhered to bottom wall 12. Cryogenic panel 31 is adhered to side wall 14. In FIG. 7, the top of each side wall 13, 14 is preferably at about the same elevation as the upper surface of precast concrete containment 24. Precast concrete containment 24 can be in sections that are preferably held together with tie rods 51 (see FIGS. 6-8). Keeper plate 71 can be used to maintain the position of bottom wall 12 upon transverse member 22.

In FIG. 8, the trough section 50 can have side walls 32, 33 of differing heights. For example, the side wall 32 extends upwardly to an elevation that is preferably about even with the upper surface of precast concrete containment 24. Side wall 33 is preferably a shorter side wall that does not extend as tall as the side wall 32. Bottom wall 34 extends between the side walls 32, 33 as shown. A cryogenic panel 35 can be adhered to side wall 32. A cryogenic panel 36 can be adhered to bottom wall 34. Cryogenic panel 37 can be adhered to side wall 33. An end of panel 36 is designated by the numeral 38 in FIG. 8, and preferably the location of recess 44 that is receptive of side wall 32.

Joints at 41, 42 are provided for joining side wall 32 to bottom wall 34 (joint 41) and at 42 for joining side wall 33 to bottom wall 34. The numeral 43 indicates the end of panel 36 that is applied to bottom wall 34. Recess 45 in bottom panel 34 is receptive of side wall 33.

Keeper plates 46, 47 can be used to maintain the position of bottom wall 34 upon transverse member 22. Anchor bolts or other bolted connections or fasteners can be used at 48, 49 to help secure each side wall 32, 33 at joints 41, 42 to bottom wall 34 as shown in FIG. 8.

FIG. 1 shows a plan view of a pipe rack/support structure arrangement 15.

FIG. 2 shows elevation views of differently configured pipe rack/support structures FIGS. 3A-3F are detail views of a trough section and a pipe rack 15.

FIG. 4 is a plan view of pipe rack layout.

FIG. 5 is an elevation view of a trough arrangement.

FIG. 6 is another example of a pipe rack layout in plan view.

FIG. 11 shows an alternate arrangement wherein beam 19 having web 61 and opposed flanges 66 (e.g., I beam) supports two abutting trough sections 11. Cryogen panels 25 line trough section 11. Pipe support 62 rests upon the precast concrete containment 24 at elevated curbs 63, 64. Pipe 17 or 18 rests upon support 62. Each section 11 has an angle beam at 65 which can be bolted (using fastener, bolt, anchor bolt, drill in anchor, or Hilti style anchor 67) to an upper flange 66 of beam 19. If a bolt is used, there can be an internally threaded insert for connection to the bolt.

The following is a list of parts and materials suitable for use in the present invention:

| PARTS LIST: | |
|---|---|
| PART NUMBER | DESCRIPTION |
| 10 | trench apparatus/LNG trench/trough apparatus |
| 11 | section/straight trough section |
| 12 | bottom wall |
| 13 | side wall |
| 14 | side wall |
| 15 | pipe rack/support structure |
| 16 | footing/foundation |
| 17 | pipe/flow line |
| 18 | pipe/flow line |
| 19 | transverse beam |
| 20 | column |
| 21 | column |
| 22 | transverse beam |
| 23 | diagonal support |
| 24 | precast concrete containment |
| 25 | cryogenic panel |
| 26 | cryogenic insulating capping/riser |
| 27 | end of cryogenic panel |
| 28 | recess |
| 29 | cryogenic panel |
| 30 | cryogenic panel |
| 31 | cryogenic panel |
| 32 | side wall |
| 33 | side wall |
| 34 | bottom wall |
| 35 | cryogenic panel |
| 36 | cryogenic panel |
| 37 | cryogenic panel |
| 38 | end of panel |
| 41 | joint |
| 42 | joint |
| 43 | end of panel |
| 44 | recess |
| 45 | recess |
| 46 | keeper plate |
| 47 | keeper plate |
| 48 | fastener/anchor bolt |
| 49 | fastener/anchor bolt |
| 50 | trough section |
| 51 | tie rod |
| 52 | fastener |
| 53 | metal deck |
| 54 | curb |
| 55 | reinforcement/steel |
| 60 | soil mass/earth's surface |
| 61 | web |
| 62 | pipe support |
| 63 | curb |
| 64 | curb |
| 65 | angle beam |
| 66 | upper flange |
| 67 | fastener/bolt/anchor bolt |
| 70 | joint |
| 71 | keeper plate |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of installing a trench for containing a cryogenic spill, comprising the steps of:
   a) constructing multiple precast concrete sections to form a trough, each section having a bottom wall and spaced apart side walls connected to and extending up from said bottom wall;
   b) wherein in step "a" each section has end portions that enable connection to another said concrete section;
   c) providing multiple panels of cryogenic insulative material;
   d) adhering one or more of said multiple panels of step "c" to the bottom wall and side walls of each said concrete section;
   e) connecting the concrete sections together using connections of one end portion to another end portion;
   f) applying an epoxy grout to the connections of step "e";
   g) wherein in step "f" the connection includes and filling a gap in between the end portions with a seal;
   h) placing the trough next to pipe racks holding elevated cryogenic containing flow lines;
   i) connecting the trough to an area under the pipe rack with a slab; and
   j) placing a riser on the slab opposite the trough.

2. The method of claim 1 wherein each panel has an upper surface and a lower surface and further comprising applying the adhesive to the upper surface.

3. The method of claim 1 wherein each panel is between about one half and three inches thick.

4. The method of claim 1 wherein in the pipe racks supports the trough in step "h".

5. The method of claim 1 wherein at least one of the side walls has a side wall height and wherein the panels extend vertically only part of said side wall height.

6. The method of claim 1 wherein the riser is a precast concrete section.

7. A method of installing a trench for containing a cryogenic spill, comprising the steps of:
   a) constructing multiple precast concrete sections to form a trough, each section having a bottom wall and spaced apart side walls connected to and extending up from said bottom wall;
   b) wherein in step "a" each section has end portions that enable connection to another said concrete section;
   c) providing multiple panels of cryogenic insulative material;
   d) adhering one or more of said multiple panels of step "c" to the bottom wall and side walls of each said concrete section;
   e) connecting the concrete sections together using connections of one end portion to another end portion;
   f) applying a non-sag filler to the connections of step "e";
   g) placing the trough next to a pipe rack that supports one or more cryogenic material flow lines;
   h) connecting the trough to a slab area under the pipe rack; and
   i) placing a vertically extending riser on the slab area opposite the trough.

8. The method of claim 7 wherein the trough is supported at least in part by the pipe rack.

9. The method of claim 7 wherein in step "e" the flow lines are in between the trough and the riser.

10. The method of claim 7 wherein the side walls are of differing heights.

11. The method of claim 10 wherein the trough has a said side wall that is shorter and wherein the riser extends above said shorter side wall.

12. The method of claim 10 wherein the trough has a said side wall that is taller and wherein the taller side wall extends above the said flow lines.

13. The method of claim 7 wherein the riser extends above the said one or more flow lines.

14. A cryogen flow line spill containment apparatus, comprising:
- a) a pipe rack structure having a base and a superstructure extending up from the base;
- b) the rack structure including a transverse support that is elevated above said base, said transverse support holding one or more flow lines;
- c) a slab supported by said transverse support;
- d) a reinforced concrete trough next to the slab and positioned to receive any spillage of cryogen material from said one or more flow lines;
- e) a riser extending vertically from said slab and positioned opposite said trough;
- f) multiple cryogen insulative panels attached to said trough and to said slab;
- g) said trough being formed of multiple trough sections placed end to end, each said section having a bottom wall and spaced apart side walls; and
- h) a cryogen insulative filler placed at a joint of one said section to another, adjacent said section.

15. The cryogen flow line spill containment apparatus of claim 14 wherein each said section has multiple attached cryogen insulative panels.

16. The cryogen flow line spill containment apparatus of claim 14 wherein the riser is of a concrete material.

17. The cryogen flow line spill containment apparatus of claim 14 wherein the riser extends above the one or more flow lines.

18. The cryogen flow line spill containment apparatus of claim 14 wherein the said side walls are of differing heights.

19. The cryogen flow line spill containment apparatus of claim 14 wherein each section side wall has a cryogen insulative panel attached thereto.

20. The cryogen flow line spill containment apparatus of claim 14 wherein each section bottom wall has a cryogen insulative panel attached thereto.

21. The cryogen flow line spill containment apparatus of claim 14 wherein the section bottom wall is below the slab.

22. The cryogen flow line spill containment apparatus of claim 14 wherein the side walls include a taller side wall having an upper edge that is at about the same level as the slab.

23. The cryogen flow line spill containment apparatus of claim 14 wherein the side walls include a taller side wall and a shorter side wall.

24. The cryogen flow line spill containment apparatus of claim 14 wherein the trough sections are elevated and supported by the pipe rack structure.

\* \* \* \* \*